United States Patent [19]

Okushima et al.

[11] Patent Number: 5,719,368
[45] Date of Patent: Feb. 17, 1998

[54] APPARATUS FOR JOINING BILLETS IN CONTINUOUS ROLLING MILL

[75] Inventors: Koji Okushima; Soichi Aoyama; Susumu Okawa, all of Yokohama, Japan

[73] Assignee: NKK Corporation, Tokyo, Japan

[21] Appl. No.: 703,367

[22] Filed: Aug. 26, 1996

[30] Foreign Application Priority Data

Aug. 31, 1995 [JP] Japan ................. 7-223147

[51] Int. Cl.$^6$ ................................... B23K 11/04
[52] U.S. Cl. ......................... 219/97; 219/110
[58] Field of Search ................. 219/97, 100, 109, 219/110, 101

[56] References Cited

U.S. PATENT DOCUMENTS

| | | | |
|---|---|---|---|
| 3,916,140 | 10/1975 | Clews | 219/100 |
| 4,012,619 | 3/1977 | Lifshits et al. | 219/101 |
| 4,101,753 | 7/1978 | Buff et al. | 219/97 |
| 4,376,242 | 3/1983 | Buff et al. | 219/97 |
| 5,190,204 | 3/1993 | Jack et al. | 228/5.7 |
| 5,605,283 | 2/1997 | Lahnsteiner | 238/164 |

FOREIGN PATENT DOCUMENTS

| | | |
|---|---|---|
| 1056454 | 4/1959 | Germany . |
| 1112795 | 8/1961 | Germany . |
| 2836338 | 2/1980 | Germany . |
| 60-216905 | 10/1985 | Japan . |
| 4-157091 | 5/1992 | Japan . |
| 6-63774 | 3/1994 | Japan . |

*Primary Examiner*—Adolf Berhane
*Attorney, Agent, or Firm*—Frishauf, Holtz, Goodman, Langer & Chick

[57] ABSTRACT

An apparatus for joining billets in continuous rolling mill comprises a pair of parallel rails 14, a travelling welding machine 4 having first support rolls 54,55, a travelling grinding machine 5 having second support rolls 56a, 56b, 57, a first group of carriages 41,42,43 each of which has a third support roll 51,52,53 for supporting billets, and a second group of carriages 44,45,46 each of which has a fourth support roll 58,59,60 for supporting billets. The travelling welding machine welds a rear end of a preceding billet with a front end of a succeeding billet while moving on the pair of rails. The travelling grinding machine removes burrs on a weld zone of the billets while moving on the pair of rails. The first group of carriages is arranged upstream of the travelling welding machine and is connected with the travelling welding machine by a flexible joint member. The second group of carriages is arranged downstream of the travelling grinding machine and is connected with the travelling grinding machine by a flexible joint member.

8 Claims, 4 Drawing Sheets

WELD-COMPLETION
SIGNAL

APPARATUS FOR JOINING BILLETS IN CONTINUOUS ROLLING MILL

BACKGROUND OF THE INVENTION

1. Field of the Invention

The present invention relates to a continuous rolling mill for continuously rolling billets to produce bars and rods, particularly to an apparatus for continuously joining the billets at an elevated temperature.

2. Description of the Related Arts

For manufacturing bars and rods from billets by continuously joining the bars and rods at an elevated temperature and by continuously rolling the joined bars and rods, the adoption of a mechanism to move the welding machine and the grinding machine along with the running billets is necessary. Owing to the mechanism, no stationary roller to support billets can be arranged within the moving range of the welding machine and the grinding machine. To cope with the situation, a known method adopts a mechanism to allow the roll to escape from the moving welding machine and grinding machine thereover using, for example, lifting means, hanging means, or travelling means.

Since billets run between the welding machine and the grinding machine while leaving weld bead thereon, the weld bead passes over the roll if the roll is positioned between the welding machine and the grinding machine. If a weld bead passes over the roll while the billet is held by a downstream rolling stand, the rolling operation may suffer bad influence, and the billet may not be able to correctly pass through an induction coil of induction heater which is positioned directly downstream to the rolling stand. Consequently, the roll between the welding machine and the grinding machine is required to escape while the weld bead passes thereover, and required to have a mechanism for escaping the roll from the weld bead. Therefore, the number of that type of rolls is minimized.

SUMMARY OF THE INVENTION

It is an object of the present invention to provide an apparatus for joining billets in a continuous rolling mill wherein the number of support rolls is minimized as a total and the support roll between the welding machine and the grinding machine is eliminated.

To attain the object, the present invention provides an apparatus for joining billets in a continuous rolling mill, which comprises a pair of parallel rails, a travelling welding machine having first support rolls, a travelling grinding machine having second support rolls, a first group of carriages each of which has a third support roll for support billets, and a second group of carriages each of which has a fourth support of roll for support billets.

The travelling welding machine welds a rear end of a preceding billet with a front end of a succeeding billet while moving on the pair of rails. The travelling grinding machine removes burr on weld zone of the billets while moving on the pair of rails. The first group of carriages is arranged at upstream of the travelling welding machine and is connected with the travelling welding machine by a flexible joint member, thereby the first group of carriages travels on the pair of rails following the movement of the travelling welding machine. The second group of carriages is arranged at downstream of the travelling grinding machine and is connected with the travelling grinding machine by a flexible joint member, thereby the second group of carriages travels on the pair of rails following the movement of the travelling grinding machine.

According to the present invention, the first group of carriages moves along with the movement of the travelling welding machine, and the second group of carriages moves along with the movement of the running grinding machine. For example, when the travelling welding machine is positioned at lowermost downstream at the completion of welding operation, the first group of carriages is also hauled to downstream by the welding machine, which results in a maximum distance between each carriage. When the travelling grinding machine is positioned at uppermost upstream in the waiting mode, the second group of carriages is also hauled to upstream, which results in a maximum distance between each carriage. The maximum carriage distance is set to a value shorter than the maximum roll distance defined on the basis of billet supporting.

In the case that the travelling welding machine and the travelling grinding machine are separately running, the maximum distance between the travelling welding machine and the travelling grinding machine is established at the time of completing the grinding by the travelling grinding machine, and the distance corresponds to the travel of the travelling grinding machine during grinding operation, though the travel is not so long. Therefore, the maximum distance between support rolls which are mounted on each of the travelling welding machine and the travelling grinding machine becomes not so large, so the billet is adequately supported even if no support roll is located between the travelling welding machine and the travelling grinding machine.

The joining apparatus of the present invention further comprises position control means to control positions of the travelling welding machine and the travelling grinding machine. The position control means comprises first control means to move the travelling welding machine and the travelling grinding machine to an uppermost upstream side before welding; second control means to move the travelling welding machine and the travelling grinding machine to a downstream side synchronously with the movement of the billets in welding; third control means to move the travelling welding machine and the travelling grinding machine to an upstream side until the travelling grinding machine detects a weld bead on a billet after welding; and fourth control means to move the travelling grinding machine to a downstream side synchronously with the movement of the billets in grinding.

DESCRIPTION OF THE EMBODIMENT

Figure 4:
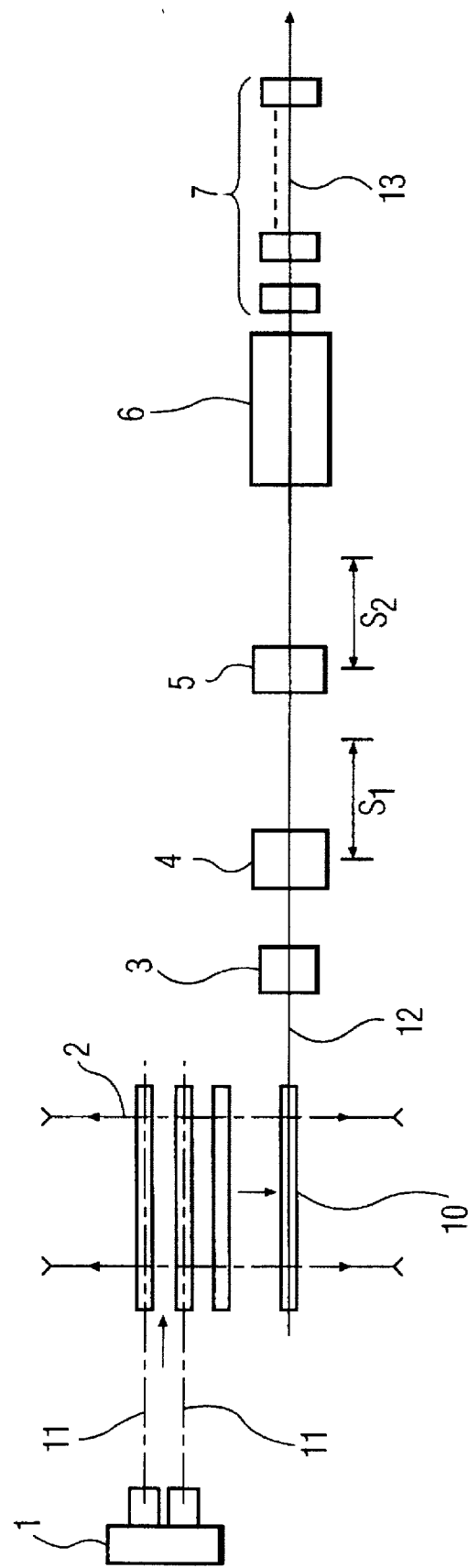
FIG. 4 is a schematic representation showing the continuous rolling mill applied to the present invention.

Hot direct rolling type continuous rolling mill will be explained based on FIG. 4. The hot direct rolling is abbreviated as HDR. FIG. 4 is a schematic representation showing the continuous rolling mill applied to the present invention. The continuous casting machine 1 given in FIG. 4 is a continuous casting machine with two strands. The casting line 11 and the rolling line 13 are arranged in parallel to each other. The billets 10 continuously cast by the continuous casting machine 1 are transferred onto the chain conveyer 2 which is positioned to cross the billet joining line 12 at a right angle. The billet joining line 12 connects the rolling line 13 at a right angle. The joining line 12 has the de-scaling unit 3, the running flash butt welding unit 4, the running grinding unit 5, and the induction heating unit 6 in the order from the upstream to downstream. The rolling line 13 consists of a row of rolling devices 7 that is structured by a plurality of rolling stands. The chain conveyer 2 intermittently rotates and ascends and descends. The chain conveyer 2 descends to transport the billets 10 and to transfer one at a time onto a support roll (not shown) structuring the joining line 12. In this manner, the continuously cast billets 1 are directly charged onto the joining line 12 one by one.

The directly charged billets 10 move while maintaining nearly equal distance therebetween. First, at the de-scaling unit 3, injection of high pressure water against the billet removes the scale mainly on the front end and the rear end of each billet 10. Next, the waited flash butt welding unit 4 welds the rear end of a preceding billet with the front end of a succeeding billet while running along with the billets. The flash butt welding unit 4 conducts the flash butt welding while traveling a specified stroke S1 at a speed near that of the moving billets. After completing the welding, the flash butt welding unit 4 returns to the original position. In this manner, the welding unit 4 repeats the flash butt welding to join the welded continuous billet with the succeeding billet. Thus, the billets 10 are successively welded together by flash butt welding. The burrs on welded parts are ground by the running grinding unit 5 successively. Also the running grinding unit 5 conducts burr-removal while traveling a specified stroke S2. After completing the burr-removal operation, the running grinding unit returns to the original position to resume the burr-removing cycle on the welded parts. Thus, the burrs on welded parts are successively removed. Following the above-described procedure, the continuous billet is fed to the succeeding induction heating unit 6 while the burrs on welded parts are removed by the running grinding unit 5. The continuous billet is heated to 950° to 1050° C. The heated continuous billet is then subjected to continuous rolling in a row of rolling mill 7.

Figure 1:
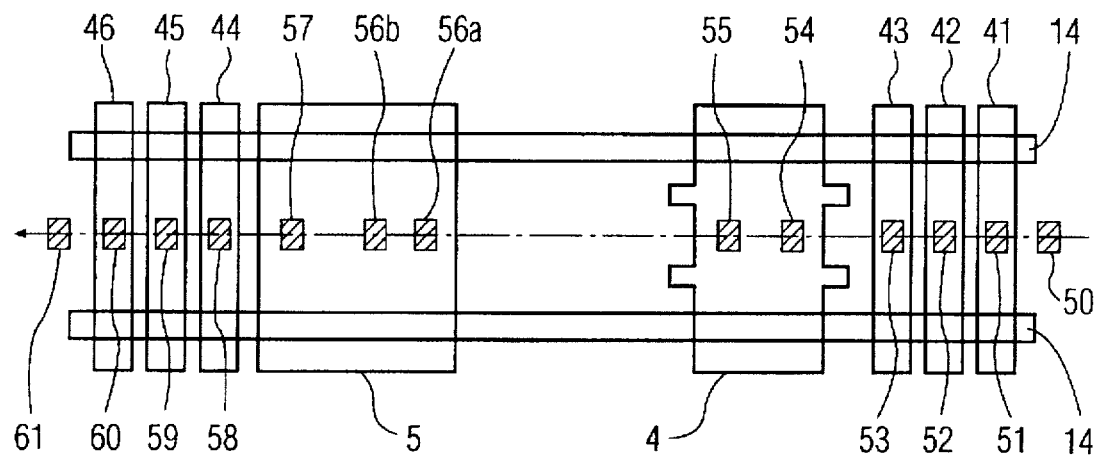
FIG. 1 is a schematic plan view showing an arrangement of an apparatus for joining billets in a continuous rolling mill according to the present invention.

FIG. 1 is a schematic plan view showing an arrangement of an apparatus for joining billets in continuous rolling mill. The stationary roll 50 is located at uppermost upstream immediately followed by the three carriages 41 through 43 which move on the rails 14. The carriages 41 through 43 have the support rolls 51 through 53, respectively. The travelling flash butt welding unit 4 that is positioned directly after the carriage 43 is provided with the support rolls 54, 55. The travelling flash butt welding unit 4 is connected with the carriages 41 through 43 using flexible joining member (for example, rope or chain). When the travelling flash butt welding unit 4 moves to downstream, the carriages 41 through 43 are hauled thereby to move. When the travelling flash butt welding unit 4 moves upstream, the carriages 41 through 43 are pushed thereby to move upstream.

The travelling grinding unit 5 has the support rolls 56a, 56b, and 57. Both the travelling flash butt welding unit 4 and the travelling grinding unit 5 move on the rails 14, 14 for performing the function thereof. Three carriages 44 through 46 which move on the rails 14, 14, are positioned directly after the travelling grinding unit 5, and these carriages are provided with the support rolls 58 through 60, respectively. The travelling grinding unit 5 is connected with the carriages 44 through 46 using flexible joining member. When the travelling grinding unit 5 moves to upstream, the carriages 44 through 46 are hauled thereby to upstream. When the travelling grinding unit 5 moves to downstream, the carriages 44 through 46 are pushed thereby to downstream. The stationary roll 61 is located directly after the vehicle 46.

Figure 2:
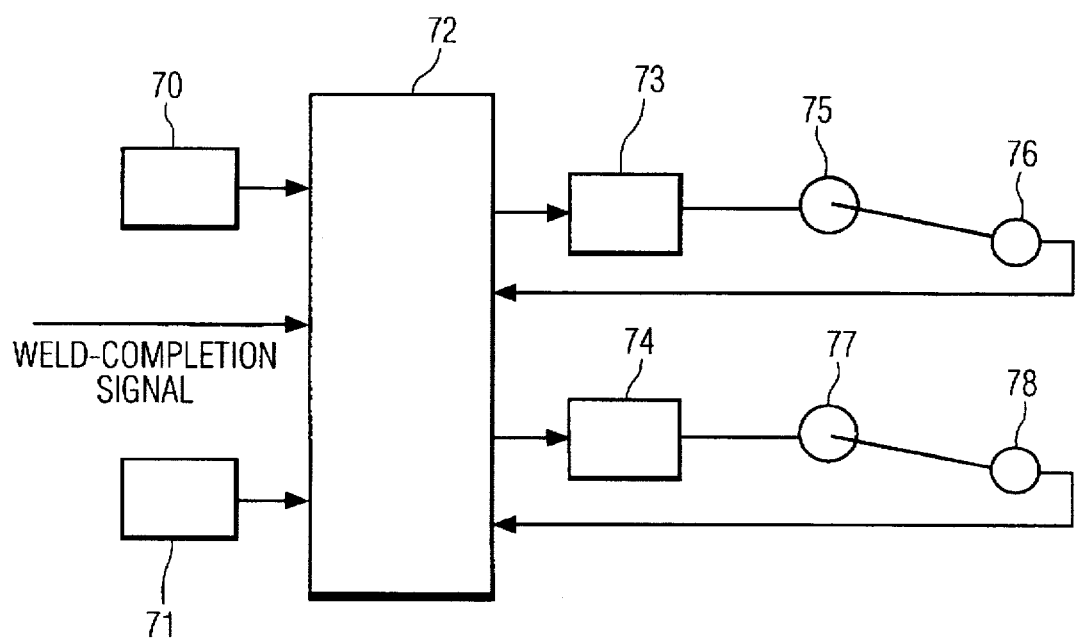
FIG. 2 is a block diagram of a control circuit for controlling the movement of the travelling welding machine and the travelling grinding machine according to the present invention.

FIG. 2 is a block diagram of control circuit for controlling the movement of the travelling flash butt welding unit 4 and the travelling grinding unit 5 shown in FIG. 1. The travelling welding unit 4 is provided with the billet detector 70 to detect the rear end of the preceding billet 10, and the travelling grinding unit 5 is provided with the weld bead detector 71 to detect the weld bead. The output of the billet detector 70 and of the weld bead detector 71 enters the control circuit 72. The control circuit 72 conducts a predetermined computation processing and generates the control signals to the drive circuits 73, 74. The drive circuit 73 drives the drive motor 75 to move the welding unit 4. The drive motor 75 has the speed detector 76, and the output of the speed detector 76 is sent to the control unit 72. The drive circuit 74 drives the drive motor 77 to move the grinding unit 5. The drive motor 77 has the speed detector 78. The output of the speed detector 78 is sent to the control unit 72.

FIG. 3 illustrates the arrangement of carriages at each control stage of the control unit 72.

Figure 3A:
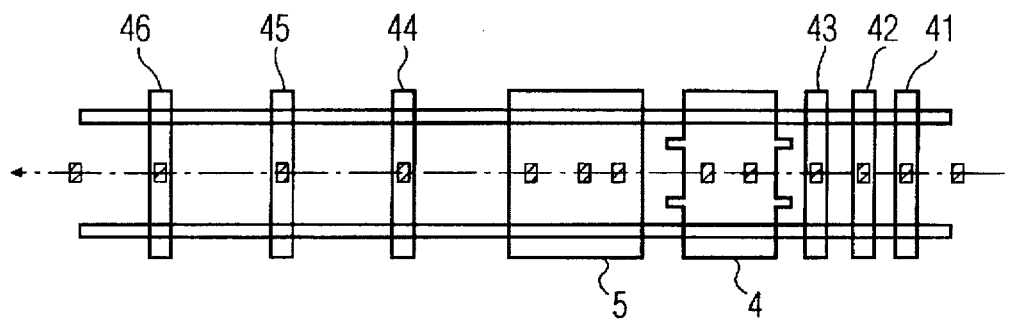
FIG. 3(A) is an explanatory view showing an arrangement of the apparatus for connecting billets at the waiting position.

1) Waiting Position (FIG. 3(A)):

First, the travelling flash butt welding unit 4 and the travelling grinding unit 5 are set at the initial state, or the waiting position. At the waiting position, the travelling flash butt welding unit 4 and the travelling grinding unit 5 are located uppermost upstream. The distance between the support rolls 51 through 53 of the carriages 41 through 43 which are connected to the travelling flash butt welding unit 4 is at the shortest state, and the distance between the support rolls 58 through 60 of the carriages 44 through 46 which are connected to the travelling grinding unit 5 is at the longest state. The maximum distance is defined by the length of the joining member that connects the travelling grinding unit 5 and each of the carriages 44 through 46.

Figure 3B:
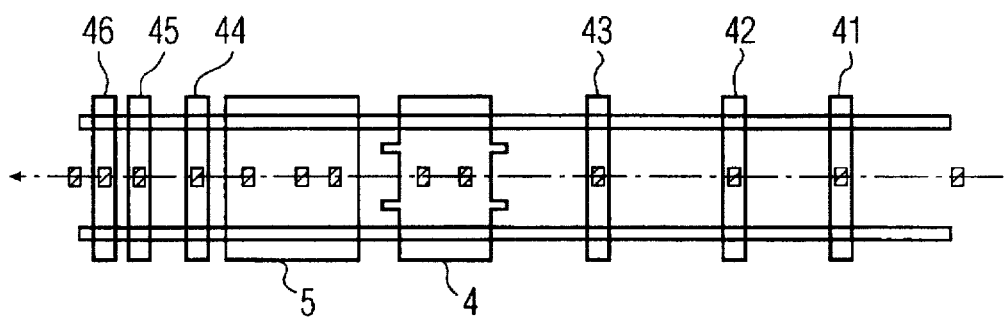
FIG. 3(B) is an explanatory view showing an arrangement of the apparatus for connecting billets at the weld-completion position.

2) Weld-Completion Position (FIG. 3(B)):

When the billet detector 70 detects the rear end of the preceding billet, the travelling flash butt welding unit 4 begins the welding operation. Along with the started flash butt welding unit 4, the control unit 72 drives the drive motors 75, 77 via the drive circuits 73, 74, respectively, to move the travelling flash butt welding unit 4 and the travelling grinding unit 5 downstream synchronously with the moving speed of the billet. At the point of completion of the welding operation, the distance between the support rolls 51 through 53 becomes the longest one owing to the hauling action of the flash butt welding unit 4 against the carriages 41 through 43. The maximum distance is defined by the length of joining member that connects the travelling flash butt welding unit 4 and each of the carriages 41 through 43.

The carriages 44 through 46 are pushed by the travelling grinding unit 5 to downstream, thus the distance between the support rolls 58 through 60 becomes the shortest one.

Figure 3C:
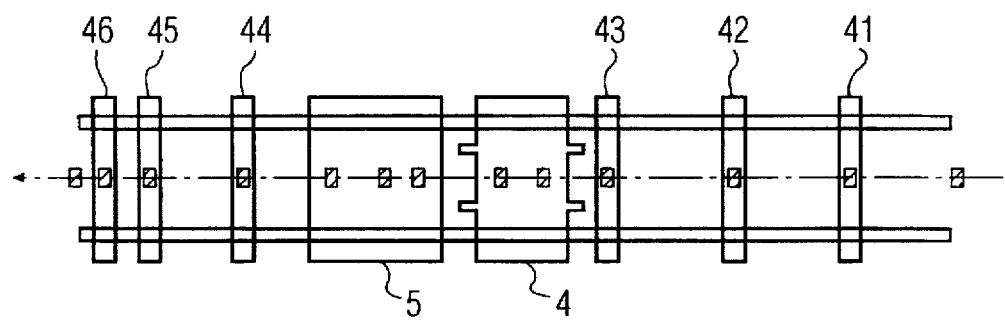
FIG. 3(C) is an explanatory view showing an arrangement of the apparatus for connecting billets at the grinding-start position.

3) Grinding-Start Position (FIG. 3(C)):

When the welding operation is complete, the control unit 72 receives the weld-completion signal from the travelling flash butt welding unit 4. Based on the entered signal, the control unit 72 moves the travelling flash butt welding unit 4 and the travelling grinding unit 5 upstream. When the weld bead detector 71 of the travelling grinding unit 5 detects the weld bead on a billet, the control unit 72 stops the movement of the travelling flash butt welding unit 4 and the travelling grinding unit 5. Then, the travelling grinding unit 5 begins the grinding operation. At that moment, the distance between each of the carriages 41 through 43 is slightly contracted from the most extended position, and the distance between each of the carriages 44 through 46 is slightly extended from the most contracted position. The distance between the support rolls 51 through 53 and between each of the support rolls 58 through 60 for the carriages 41 through 46 corresponds to the distance of the carriages.

Figure 3D:
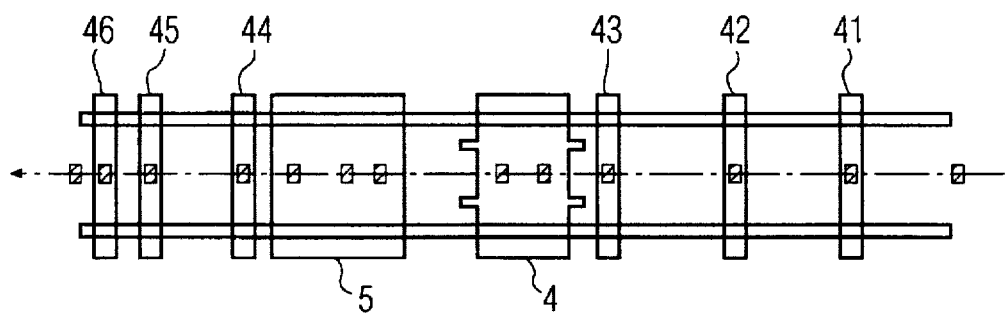
FIG. 3(D) is an explanatory view showing an arrangement of the apparatus for connecting billets at the grinding-completion position.

4) Grinding-completion position (FIG. 3(D)):

The travelling flash butt welding unit 4 stays at the stop position at the beginning of the grinding operation, and the travelling grinding unit 5 grinds the weld bead while moving downstream. The carriages 41 through 43 stay at the grinding-start position because the travelling flash butt welding unit 4 does not move. The carriages 44 through 46, however, move to a slightly contracted position by each other compared with the state of grinding-start because the travelling grinding unit 5 moved downstream. The distance between the support rolls 51 through 53 and between each of the support rolls 58 through 60 becomes a position corresponding to that of the carriages. Since the stroke of the travelling grinding unit 5 is approximately 1500 mm, the maximum distance between the travelling grinding unit 5 and the travelling flash butt welding unit 4 corresponds to the stroke. Accordingly, the billet is satisfactorily supported even if no support roll is positioned between the travelling flash butt welding unit 4 and the travelling grinding unit 5. When the grinding operation is completed, the travelling flash butt welding unit 4 and the travelling grinding unit 5 return to the waiting position (the position of 1), and the control sequence above-described is repeated.

The travelling flash butt welding unit 4 and the travelling grinding unit 5 may be structured in an integrated form. The integrated form also adequately supports the billets because the separated form supports the billets as described above.

In the supporting mechanism given in FIG. 1, the position of the drive roll is defined by the shortest billet length in an emergency condition. An adequate roll among the support rolls may be selected as the drive roll. It is preferable that a support roll between the welding point and the grinding point is in a free lifting mode.

Figure 5:
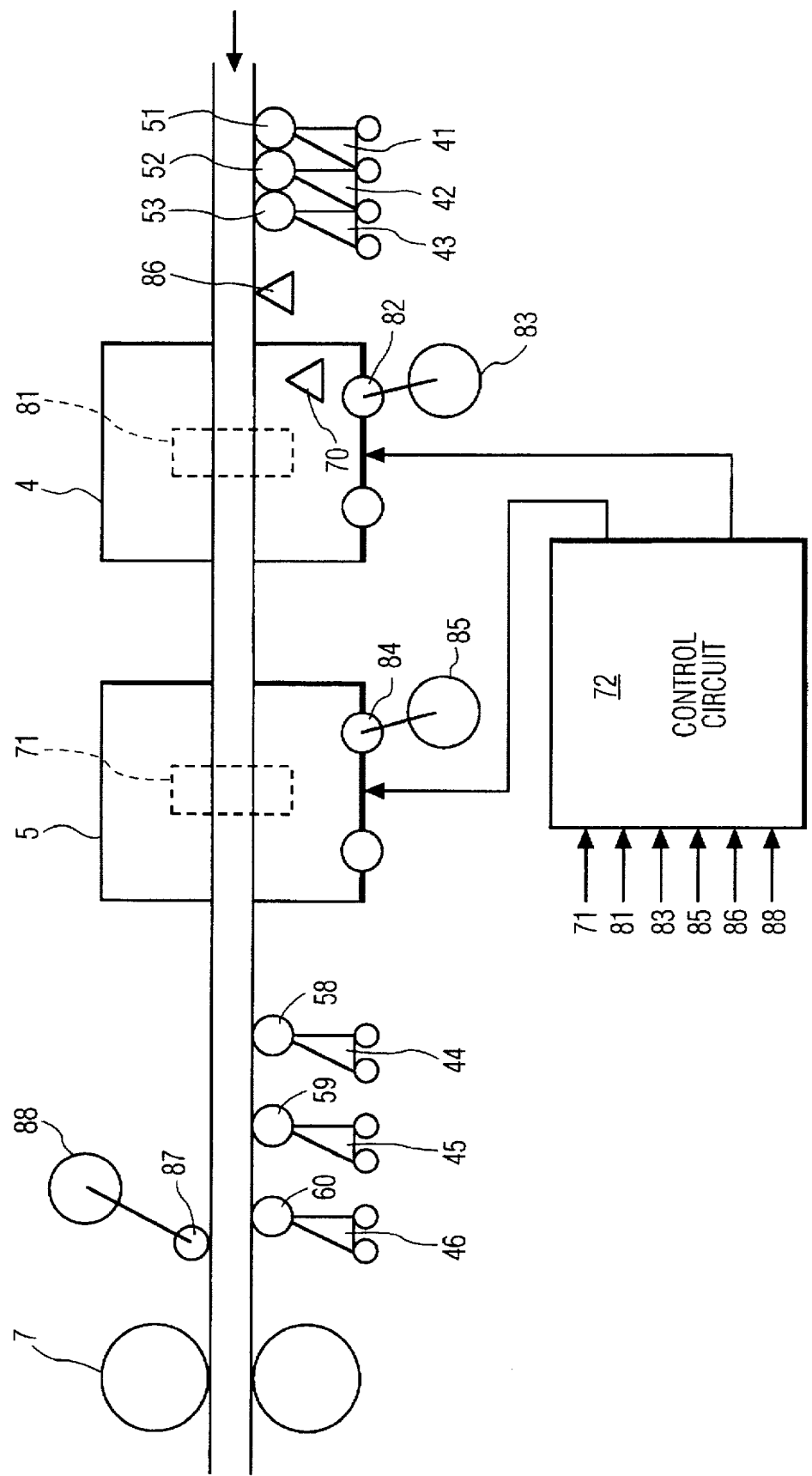
FIG. 5 is a block diagram of the control unit to control the transfer of the billets, which is applied to the present invention.

FIG. 5 is a block diagram of the controlling unit for control the transfer of the billets, which is applied to the present invention. The travelling welding unit 4 is provided with a distance detector 81 for detecting a distance between billets, a measuring roll 82 and a pulse generator 83. The travelling grinding unit 5 is provided with a bead detector 71, a measuring roll 84 and a pulse generator 85. A billet front end and rear end detector 86 is arranged downstream of the transfer table which is positioned upstream of the travelling welding unit 4. A measuring roll 87 is arranged at the transfer table which is positioned downstream of the travelling welding unit. A pulse generator 88 is connected to the measuring roll 87. Outputs from the bead detector 71, the distance detector 81, the billet front end and rear end detector 86 and the pulse generator 83, 85, 87 are inputted to a controlling circuit 72. The controlling circuit 72 performs a predetermined processing treatment.

As described above, according to the present invention, the first support roll mounted to the travelling welding unit, the second support roll mounted to the travelling grinding unit, the third support roll mounted to each of the first group carriages, and the fourth support roll mounted to each of the second group carriages support the billets, and the third support roll and the fourth support roll are allowed to move along with the movement of the travelling flash butt welding unit and of the travelling grinding unit. As a result, the number of support rolls to support the billets is minimized. In addition, even when each of the travelling welding unit and the travelling grinding unit is separately moved, the billets are satisfactorily supported only by the support roll mounted to each of the travelling welding unit and the travelling grinding unit without providing a support roll between the travelling welding unit and the travelling grinding unit.

What is claimed is:

1. An apparatus for joining billets in a continuous rolling mill comprising:
   a pair of parallel rails;
   a travelling welding machine having first support rolls for supporting billets, said travelling welding machine welding a rear end of a preceding billet with a front end of a succeeding billet while moving on the pair of parallel rails;
   a travelling grinding machine having second support rolls for supporting billets, said travelling grinding machine removing burrs on a weld zone of the billets while moving on the pair of parallel rails;
   a first group of carriages, each of the carriages of said first group of carriages having a third support roll for supporting billets, said first group of carriages being arranged upstream of the travelling welding machine and being connected with the travelling welding machine by a flexible joint member, thereby the first group of carriages travelling on the pair of parallel rails follows the movement of the travelling welding machine; and
   a second group of carriages, each of the carriages of the second group of carriages having a fourth support roll for supporting billets, said second group of carriages being arranged downstream of the travelling grinding machine and being connected with the travelling grinding machine by a flexible joint member, thereby the second group of carriages travelling on the pair of parallel rails follows the movement of the travelling grinding machine.

2. The apparatus of claim 1, further comprising position control means for controlling positions of the travelling welding machine and the travelling grinding machine.

3. The apparatus of claim 2, wherein said position control means comprises:
   first control means for moving the travelling welding machine and the travelling grinding machine to an uppermost upstream side before welding;
   second control means for moving the travelling welding machine and the travelling grinding machine to a downstream side synchronously with the movement of the billets in welding;
   third control means for moving the travelling welding machine and the travelling grinding machine to an upstream side until the travelling grinding machine detects a weld bead on a billet after welding; and fourth control means for moving the travelling grinding machine to a downstream side synchronously with the movement of the billets in grinding.

4. The apparatus of claim 1, wherein said travelling welding machine comprise a travelling flash butt welding machine.

5. The apparatus of claim 4, wherein said travelling flash butt welding machine performs flash butt welding while travelling over a prescribed distance at an approximately same speed as that of the moving billets.

6. The apparatus of claim 1, wherein said travelling grinding machine removes burrs on the weld zone of the billets while travelling over a prescribed distance at an approximately same speed as that of the moving billets.

7. The apparatus of claim 1, wherein said travelling welding machine further comprises a billet detector for detecting a rear end of the billet, thereby the welding being commenced.

8. The apparatus of claim 1, wherein said travelling grinding machine further comprises a bead detector for detecting a weld bead, thereby the grinding being commenced.

* * * * *